(12) United States Patent
Whitehead

(10) Patent No.: US 8,040,591 B2
(45) Date of Patent: Oct. 18, 2011

(54) IONIC ELECTROPHORESIS IN TIR-MODULATED REFLECTIVE IMAGE DISPLAYS

(75) Inventor: Lorne A. Whitehead, Vancouver (CA)

(73) Assignee: The University of British Columbia, Vancouver, British Columbia (CA)

( * ) Notice: Subject to any disclaimer, the term of this patent is extended or adjusted under 35 U.S.C. 154(b) by 223 days.

(21) Appl. No.: 12/297,295

(22) PCT Filed: Apr. 10, 2007

(86) PCT No.: PCT/CA2007/000593
§ 371 (c)(1),
(2), (4) Date: Oct. 15, 2008

(87) PCT Pub. No.: WO2007/118306
PCT Pub. Date: Oct. 25, 2007

(65) Prior Publication Data
US 2009/0262414 A1    Oct. 22, 2009

Related U.S. Application Data

(60) Provisional application No. 60/745,106, filed on Apr. 19, 2006.

(51) Int. Cl.
*G02B 26/00* (2006.01)
(52) U.S. Cl. .......... 359/296; 359/290; 359/291
(58) Field of Classification Search .......... 359/222, 359/290, 291, 296, 449, 455, 459, 529, 530, 359/536, 619
See application file for complete search history.

(56) References Cited

U.S. PATENT DOCUMENTS

| | | | |
|---|---|---|---|
| 5,866,204 A | 2/1999 | Robbie et al. | |
| 5,999,307 A | 12/1999 | Whitehead et al. | |
| 6,064,784 A | 5/2000 | Whitehead et al. | |

(Continued)

FOREIGN PATENT DOCUMENTS

| | | |
|---|---|---|
| KR | 2005-2833 A | 2/2005 |
| WO | 03/075085 A1 | 9/2003 |
| WO | 2006/108285 A1 | 10/2006 |

OTHER PUBLICATIONS

Apr. 26, 2010 office action issued by the Korean Intellectual Property Office in respect of corresponding Korean patent application serial No. 10-2008-7023948.

(Continued)

*Primary Examiner* — Scott J Sugarman
*Assistant Examiner* — Mahidere Sahle
(74) *Attorney, Agent, or Firm* — Oyen Wiggs Green & Mutala LLP

(57) ABSTRACT

A reflective display having a plurality of transparent hemi-beads (60), each having a reflective region (80) surrounding a non-reflective region (82). Light absorbing, electrostatically charged ions are dissolved in an electrophoretic medium (20) maintained adjacent the hemi-beads. A voltage applied across the medium moves many ions into an evanescent wave region adjacent the hemi-beads where the ions absorb light, frustrating TIR at the reflective regions. Ions in the evanescent wave region also absorb light which does not undergo TIR and which would otherwise pass through the non-reflective regions. An opposite voltage applied across the medium moves many ions away from the hemi-beads, allowing light to undergo TIR at the reflective regions. The display's brightness can be enhanced by providing a backplane electrode (48) having reflective regions (108; 110, 112) for reflecting back through the hemi-beads light which passes through the non-reflective regions to the backplane electrode.

25 Claims, 7 Drawing Sheets

U.S. PATENT DOCUMENTS

| | | |
|---|---|---|
| 6,130,732 A | 10/2000 | Crawford et al. |
| 6,206,065 B1 | 3/2001 | Robbie et al. |
| 6,215,920 B1 | 4/2001 | Whitehead et al. |
| 6,248,422 B1 | 6/2001 | Robbie et al. |
| 6,753,846 B2 * | 6/2004 | Takeuchi et al. .............. 345/108 |
| 6,865,011 B2 | 3/2005 | Whitehead et al. |
| 6,885,496 B2 | 4/2005 | Whitehead et al. |
| 6,891,658 B2 | 5/2005 | Whitehead et al. |

OTHER PUBLICATIONS

"Transparent Conductive Carbon Nanotube Films," Z. Wu et al., Science vol. 305, No. 5668, pp. 1273-1276.

"A High Reflectance, Wide Viewing Angle Reflective Display Using Total Internal Reflection in Micro-Hemispheres," Mossman, M.A. et al., Society for Information Display, 23rd International Display Research Conference, pp. 233-236, Sep. 15-18, 2003, Phoenix, AZ.

* cited by examiner

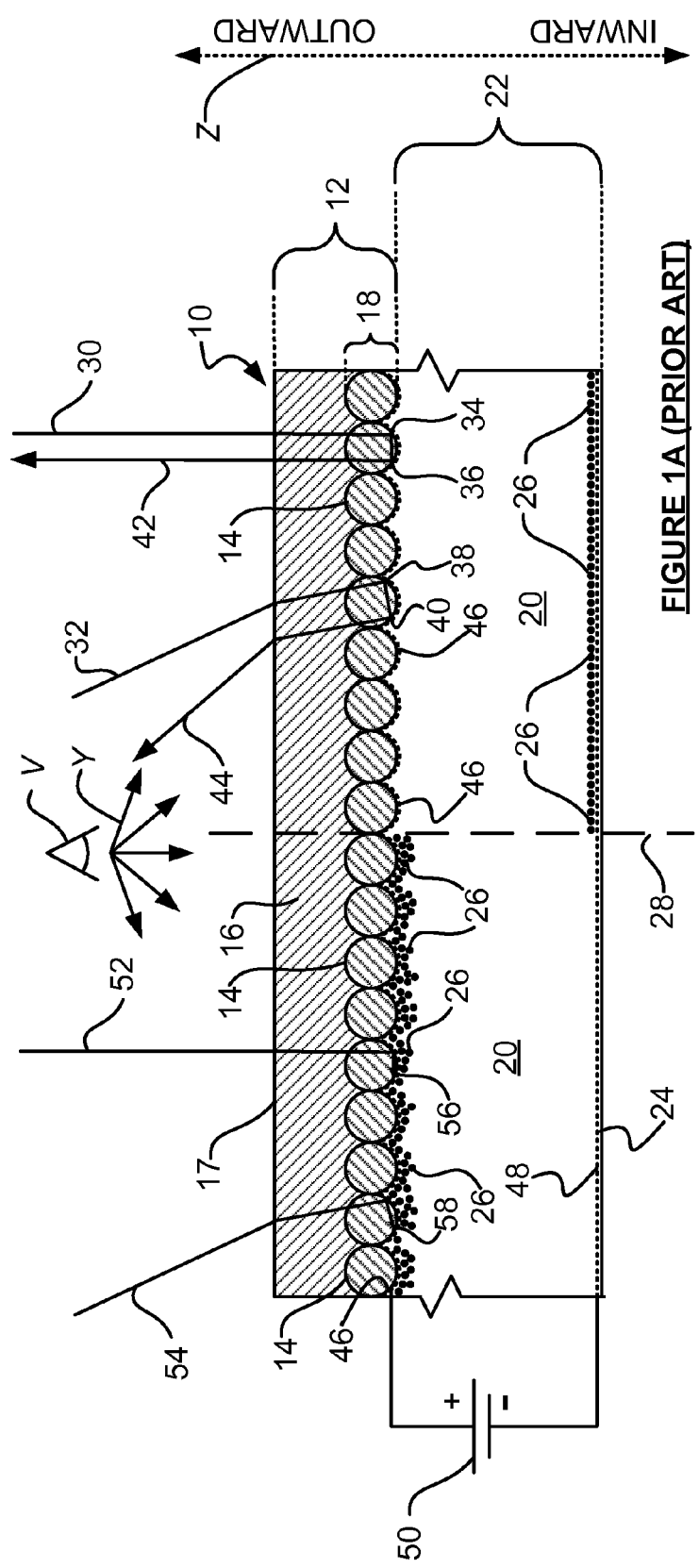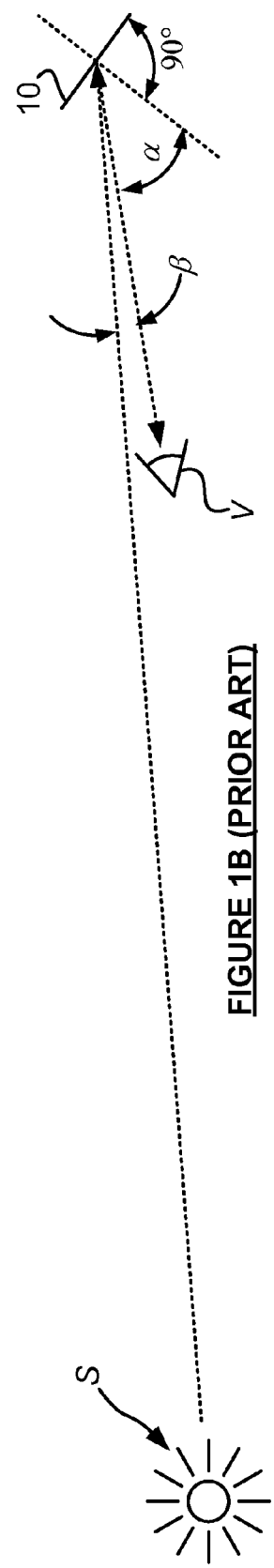
FIGURE 1A (PRIOR ART)
FIGURE 1B (PRIOR ART)

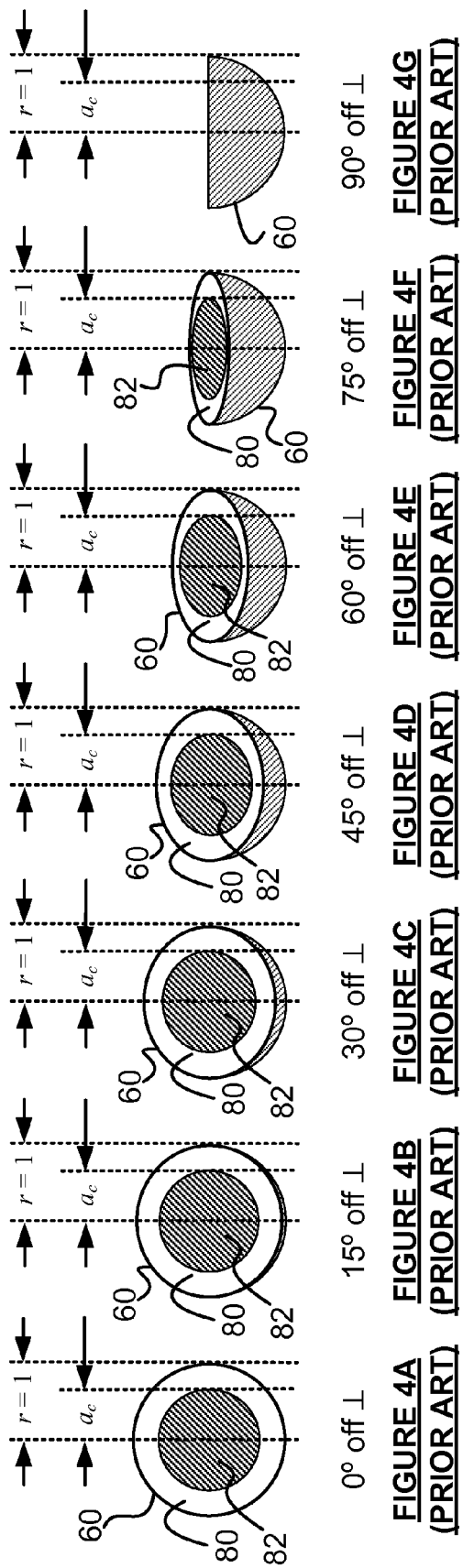

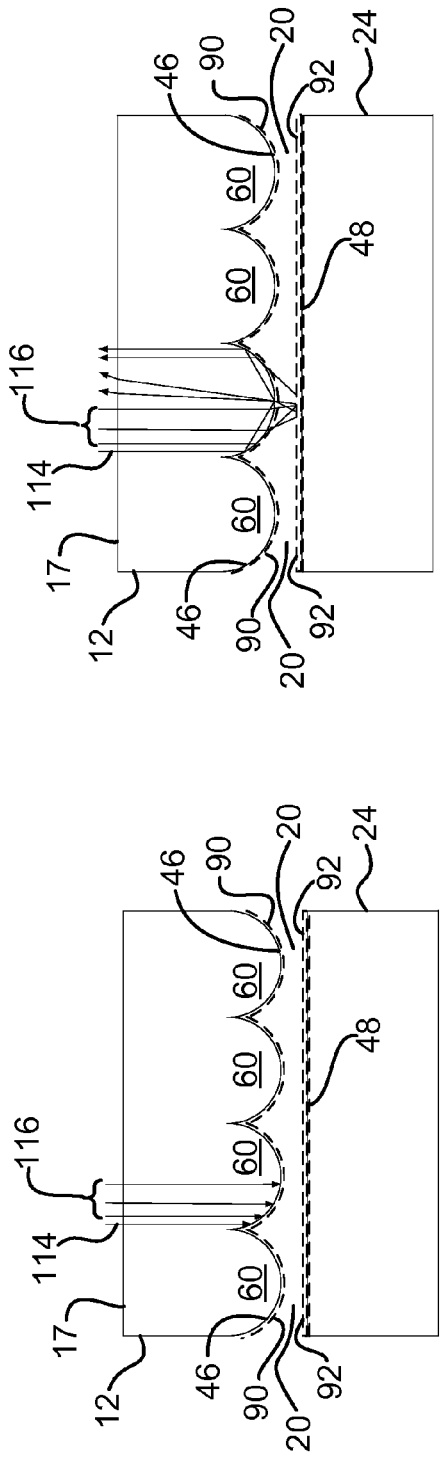
FIGURE 5A
FIGURE 5B
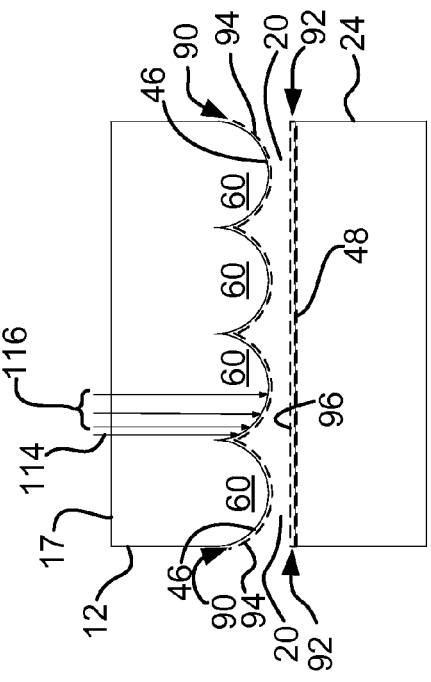
FIGURE 6

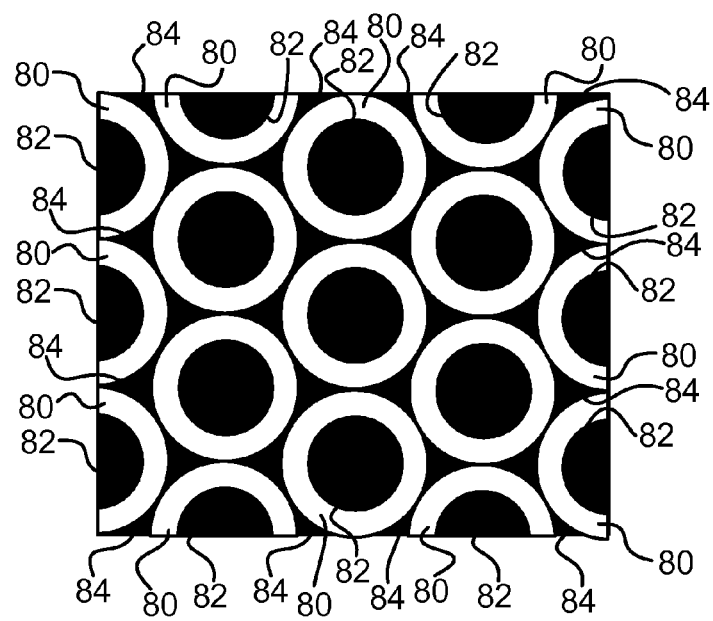
FIGURE 7 (PRIOR ART)
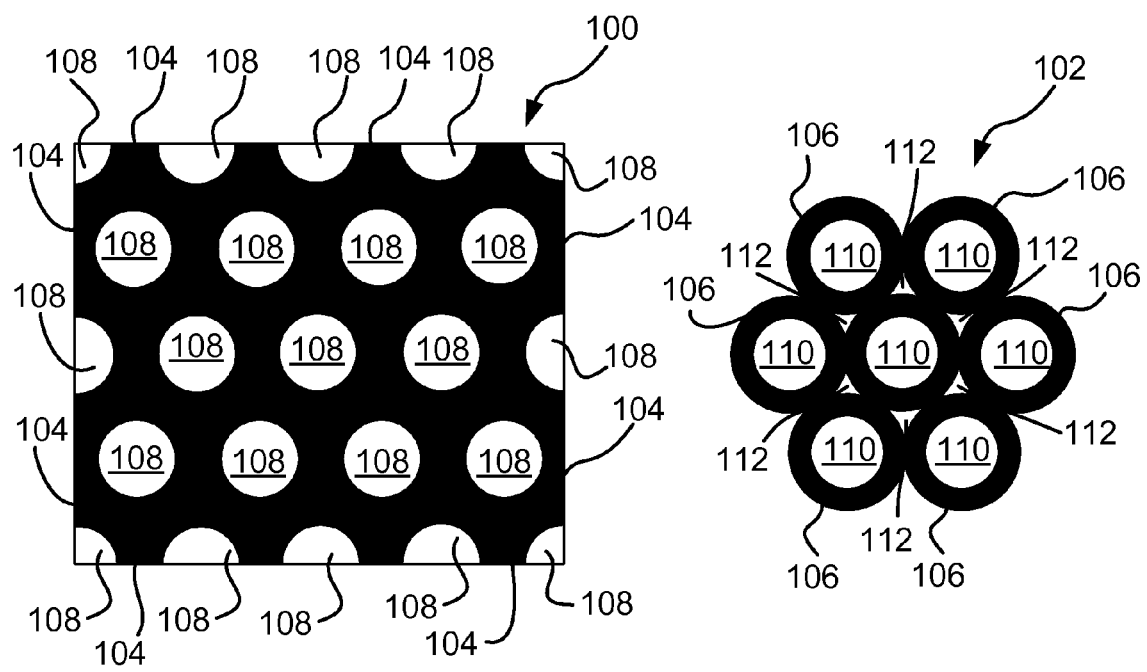
FIGURE 8A
FIGURE 8B

IONIC ELECTROPHORESIS IN TIR-MODULATED REFLECTIVE IMAGE DISPLAYS

REFERENCE TO RELATION APPLICATION

This application claims the benefit of U.S. provisional patent application Ser. No. 60/745,106 filed 19 Apr. 2006.

TECHNICAL FIELD

This disclosure pertains to attainment of high brightness in wide viewing angle reflective image displays of the type described in U.S. Pat. Nos. 5,999,307; 6,064,784; 6,215,920; 6,865,011; 6,885,496 and 6,891,658; all of which are incorporated herein by reference.

BACKGROUND

FIG. 1A depicts a portion of a prior art reflective (i.e. front-lit) electrophoretically frustrated total internal reflection (TIR) modulated display 10 of the type described in U.S. Pat. Nos. 6,885,496 and 6,891,658. Display 10 includes a transparent outward sheet 12 formed by partially embedding a large plurality of high refractive index (e.g. $\eta_1 > \sim 1.90$) transparent spherical or approximately spherical beads 14 in the inward surface of a high refractive index (e.g. $\eta_2 > \sim 1.75$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. Minimal interstitial gaps (ideally, no gaps) remain between adjacent beads.

An electrophoresis medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_3 \sim 1.27$) available from 3M, St. Paul, Minn. is a suitable electrophoresis medium. Other liquids, or water can also be used as electrophoresis medium 20. A bead:liquid TIR interface is thus formed. Medium 20 contains a finely dispersed suspension of light scattering and/or absorptive particles 26 such as pigments, dyed or otherwise scattering/absorptive silica or latex particles, etc. Sheet 24's optical characteristics are relatively unimportant: sheet 24 need only form a reservoir for containment of electrophoresis medium 20 and particles 26, and serve as a support for backplane electrode 48.

As is well known, the TIR interface between two media having different refractive indices is characterized by a critical angle $\theta_c$. Light rays incident upon the interface at angles less than $\theta_c$ are transmitted through the interface. Light rays incident upon the interface at angles greater than $\theta_c$ undergo TIR at the interface. A small critical angle is preferred at the TIR interface since this affords a large range of angles over which TIR may occur.

In the absence of electrophoretic activity, as is illustrated to the right of dashed line 28 in FIG. 1A, a substantial fraction of the light rays passing through sheet 12 and beads 14 undergoes TIR at the inward side of beads 14. For example, incident light rays 30, 32 are refracted through material 16 and beads 14. The rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

A voltage can be applied across medium 20 via electrodes 46, 48 (shown as dashed lines) which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Backplane electrode 48 need not be transparent. If electrophoresis medium 20 is activated by actuating voltage source 50 to apply a voltage between electrodes 46, 48 as illustrated to the left of dashed line 28, suspended particles 26 are electrophoretically moved into the region where the evanescent wave is relatively intense (i.e. within 0.25 micron of the inward surfaces of inwardly protruding beads 14, or closer). When electrophoretically moved as aforesaid, particles 26 scatter or absorb light, thus frustrating or modulating TIR by modifying the imaginary and possibly the real component of the effective refractive index at the bead:liquid TIR interface. This is illustrated by light rays 52, 54 which are scattered and/or absorbed as they strike particles 26 inside the thin (~0.5 μm) evanescent wave region at the bead:liquid TIR interface, as indicated at 56, 58 respectively, thus achieving a "dark" appearance in each TIR-frustrated non-reflective absorption region or pixel. Particles 26 need only be moved outside the thin evanescent wave region, by suitably actuating voltage source 50, in order to restore the TIR capability of the bead:liquid TIR interface and convert each "dark" non-reflective absorption region or pixel to a "white" reflection region or pixel.

As described above, the net optical characteristics of outward sheet 12 can be controlled by controlling the voltage applied across medium 20 via electrodes 46, 48. The electrodes can be segmented to control the electrophoretic activation of medium 20 across separate regions or pixels of sheet 12, thus forming an image.

FIG. 2 depicts, in enlarged cross-section, an inward hemispherical or "hemi-bead" portion 60 of one of spherical beads 14. Hemi-bead 60 has a normalized radius r=1 and a refractive index $\eta_1$. A light ray 62 perpendicularly incident (through material 16) on hemi-bead 60 at a radial distance a from hemi-bead 60's centre C encounters the inward surface of hemi-bead 60 at an angle $\theta_1$ relative to radial axis 66. For purposes of this theoretically ideal discussion, it is assumed that material 16 has the same refractive index as hemi-bead 60 (i.e. $\eta_1 = \eta_2$), so ray 62 passes from material 16 into hemi-bead 60 without refraction. Ray 62 is refracted at the inward surface of hemi-bead 60 and passes into electrophoretic medium 20 as ray 64 at an angle $\theta_2$ relative to radial axis 66.

Now consider incident light ray 68 which is perpendicularly incident (through material 16) on hemi-bead 60 at a distance $$a_c = \frac{\eta_3}{\eta_1}$$

from hemi-bead 60's centre C. Ray 68 encounters the inward surface of hemi-bead 60 at the critical angle $\theta_c$ (relative to radial axis 70), the minimum required angle for TIR to occur. Ray 68 is accordingly totally internally reflected, as ray 72, which again encounters the inward surface of hemi-bead 60 at the critical angle $\theta_c$. Ray 72 is accordingly totally internally reflected, as ray 74, which also encounters the inward surface of hemi-bead 60 at the critical angle $\theta_c$. Ray 74 is accordingly totally internally reflected, as ray 76, which passes perpendicularly through hemi-bead 60 into the embedded portion of bead 14 and into material 16. Ray 68 is thus reflected back as ray 76 in a direction approximately opposite that of incident ray 68.

All light rays which are incident on hemi-bead 60 at distances $a \geq a_c$ from hemi-bead 60's centre C are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications. FIGS. 3A, 3B and 3C depict three of hemi-bead 60's reflection modes. These and other modes coexist, but it is useful to discuss each mode separately.

In FIG. 3A, light rays incident within a range of distances $a_c < a \leq a_1$ undergo TIR twice (the 2-TIR mode) and the reflected rays diverge within a comparatively wide arc $\phi_1$ centred on a direction opposite to the direction of the incident light rays. In FIG. 3B, light rays incident within a range of distances $a_1 < a \leq a_2$ undergo TIR three times (the 3-TIR mode) and the reflected rays diverge within a narrower arc $\phi_2 < \phi_4$ which is again centred on a direction opposite to the direction of the incident light rays. In FIG. 3C, light rays incident within a range of distances $a_2 < a \leq a_3$ undergo TIR four times (the 4-TIR mode) and the reflected rays diverge within a still narrower arc $\phi_3 < \phi_2$ also centred on a direction opposite to the direction of the incident light rays. Hemi-bead 60 thus has a "semi-retro-reflective," partially diffuse reflection characteristic, causing display 10 to have a diffuse appearance akin to that of paper.

Display 10 has relatively high apparent brightness, comparable to that of paper, when the dominant source of illumination is behind the viewer, within a small angular range. This is illustrated in FIG. 1B which depicts the wide angular range $\alpha$ over which viewer V is able to view display 10, and the angle $\beta$ which is the angular deviation of illumination source S relative to the location of viewer V. Display's 10's high apparent brightness is maintained as long as $\beta$ is not too large. At normal incidence, the reflectance R of hemi-bead 60 (i.e. the fraction of light rays incident on hemi-bead 60 that reflect by TIR) is given by equation (1):

$$R = 1 - \left(\frac{\eta_3}{\eta_1}\right)^2 \quad (1)$$

where $\eta_1$ is the refractive index of hemi-bead 60 and $\eta_3$ is the refractive index of the medium adjacent the surface of hemi-bead 60 at which TIR occurs. Thus, if hemi-bead 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemi-bead 60 is formed of a high refractive index nano-composite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic.

As shown in FIGS. 4A-4G, hemi-bead 60's reflectance is maintained over a broad range of incidence angles, thus enhancing display 10's wide angular viewing characteristic and its apparent brightness. For example, FIG. 4A shows hemi-bead 60 as seen from perpendicular incidence—that is, from an incidence angle offset 0° from the perpendicular. In this case, the portion 80 of hemi-bead 60 for which $a \geq a_c$ appears as an annulus. The annulus is depicted as white, corresponding to the fact that this is the region of hemi-bead 60 which reflects incident light rays by TIR, as aforesaid. The annulus surrounds a circular region 82 which is depicted as dark, corresponding to the fact that this is the non-reflective region of hemi-bead 60 within which incident rays are absorbed and do not undergo TIR. FIGS. 4B-4G show hemi-bead 60 as seen from incident angles which are respectively offset 15°, 30°, 45°, 60°, 75° and 90° from the perpendicular. Comparison of FIGS. 4B-4G with FIG. 4A reveals that the observed area of reflective portion 80 of hemi-bead 60 for which $a \geq a_c$ decreases only gradually as the incidence angle increases. Even at near glancing incidence angles (e.g. FIG. 4F) an observer will still see a substantial part of reflective portion 80, thus giving display 10 a wide angular viewing range over which high apparent brightness is maintained.

Display 10 can exhibit undesirable clustering of particles 26 over time. More particularly, particles 26 tend to form loose agglomerates within electrophoretic medium 20, with the surrounding regions of electrophoretic medium 20 containing relatively few suspended particles 26. Such clustering of absorptive particles 26 can cause long-term deterioration of display 10's image quality and overall performance. As explained below, it is possible to electrophoretically frustrate TIR in display 10 without employing particles 26, thus reducing display 10's susceptibility to shortcomings caused by particle agglomeration.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 1A is a greatly enlarged, not to scale, fragmented cross-sectional side elevation view, of a portion of an electrophoretically frustrated or modulated prior art reflective image display.

FIG. 1B schematically illustrates the wide angle viewing range $\alpha$ of the FIG. 1A display, and the angular range $\beta$ of the illumination source.

FIGS. 4A, 4B, 4C, 4D, 4E, 4F and 4G depict the FIG. 2 hemi-bead, as seen from viewing angles which are offset 0°, 15°, 30°, 45°, 60°, 75° and 90° respectively from the perpendicular.

FIGS. 5A and 5B are greatly enlarged, not to scale, fragmented cross-sectional side elevation views of a portion of an electrophoretically frustrated (i.e. modulated) reflective image display incorporating light absorbing, electrostatically charged ions.

FIG. 6 is a greatly enlarged, not to scale, fragmented cross-sectional side elevation view of a portion of an electrophoretically frustrated (i.e. modulated) reflective image display incorporating a nano-structured or nanoporous electrically conductive coating.

FIG. 7 is a top plan (i.e. as seen from a viewing angle offset 0° from the perpendicular) cross-sectional view of a portion of the FIG. 1A display, showing the spherical beads arranged in a hexagonal closest packed (HCP) structure.

FIGS. 8A and 8B are top plan views, on a greatly enlarged scale, of two alternative backplane electrode patterns for use with the FIG. 7 structure.

DESCRIPTION

Figure 2:
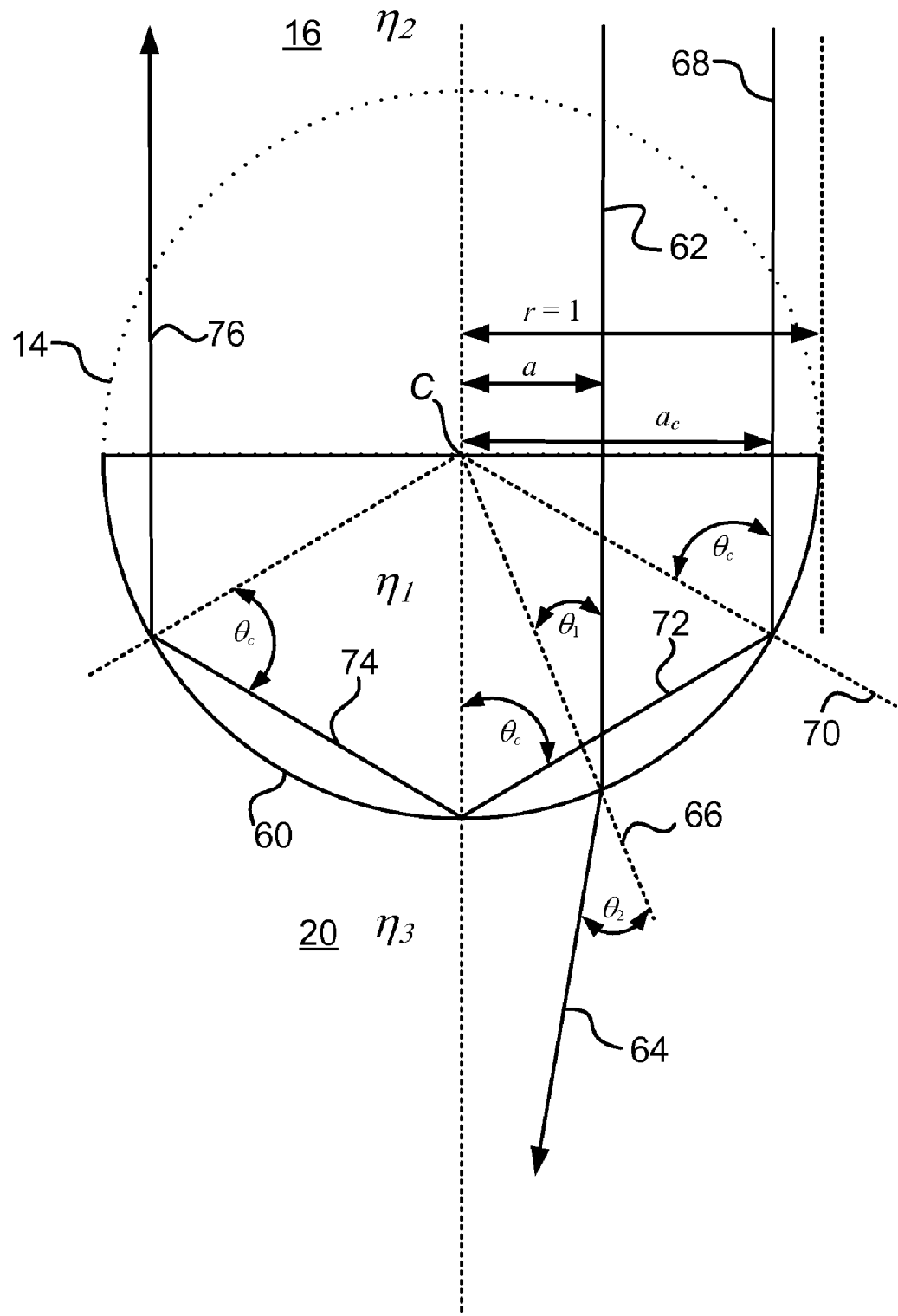
FIG. 2 is a greatly enlarged, cross-sectional side elevation view of a hemispherical ("hemi-bead") portion of one of the spherical beads of the FIG. 1A apparatus.
Figure 3C:
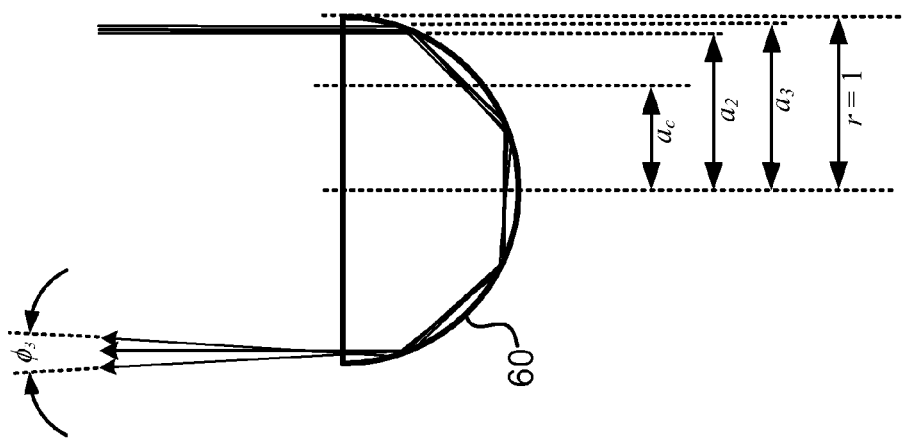
FIGS. 3A, 3B and 3C depict semi-retro-reflection of light rays perpendicularly incident on the FIG. 2 hemi-bead at increasing off-axis distances at which the incident rays undergo TIR two, three and four times respectively.
Figure 3B:
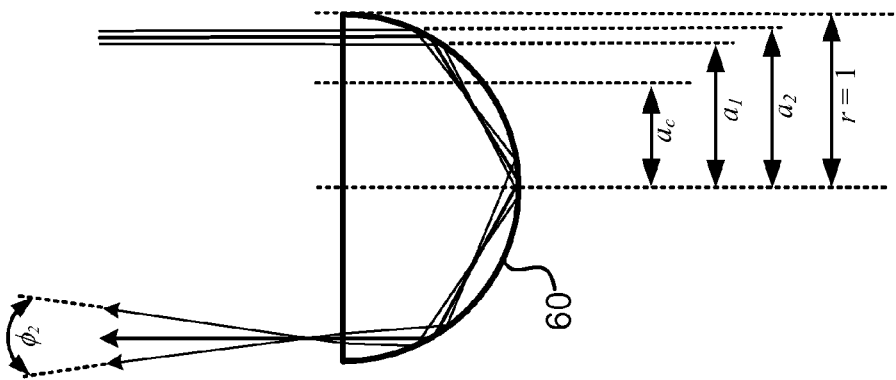
Figure 3A:
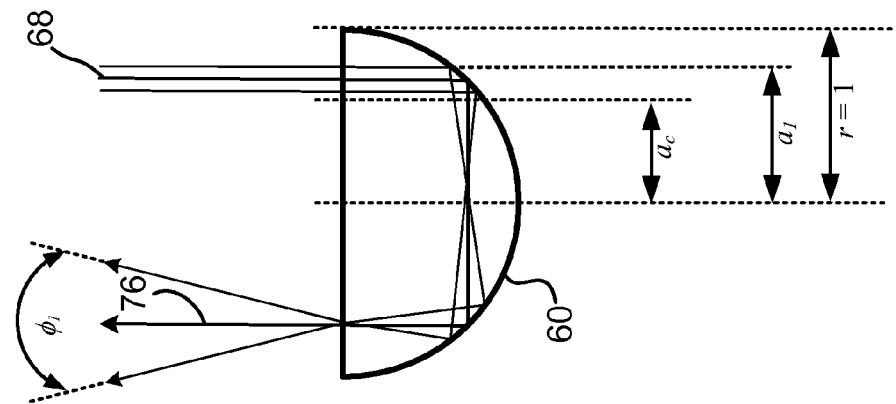

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As shown schematically in FIGS. 5A, 5B invisibly small light absorbing, soluble molecules such as dye molecules are dissolved in an inert, low refractive index (i.e. less than about 1.35), low viscosity liquid electrophoretic medium 20, such as water. When dissolved, the molecules dissociate into electrostatically charged ions. Medium 20 accordingly contains a large number of light absorbing, electrostatically charged ions which can be electrophoretically moved into or out of the evanescent wave region at the aforementioned bead:liquid TIR interface by applying an appropriate electric field.

More particularly, when dissolved, the molecules dissociate into at least one electrostatically positively charged ion species and at least one electrostatically negatively charged ion species, with the number of positive charges equaling the number of negative charges such that medium 20 overall has an electrostatically neutral charge. Typically only one ion species is light absorbing—the other species being a counter-ion which balances the total charge of the dissolved molecule. Persons skilled in the art will understand that a molecule's dissociation into its ionic constituents does not involve a chemical reaction since the chemical nature of the constituents does not change.

When electrophoresis medium 20 is activated by actuating voltage source 50 to apply a first voltage between electrodes 46, 48 a large number of light absorbing ions dissolved in medium 20 are electrophoretically moved into and concentrated within region 90 adjacent electrode 46 against the inward sides of hemi-beads 60. Simultaneously, light absorbing ions dissolved in medium 20 are electrophoretically moved out of region 92 adjacent electrode 48. Ions which move out of region 92 do not move into region 90, but remain within medium 20, between regions 90, 92.

FIG. 5A depicts the non-reflective state, in which region 90 is a "concentration region" containing a sufficiently large number of light absorbing ions to substantially cover the inward surfaces of hemi-beads 60. Persons skilled in the art will understand that the thickness of region 90 depends on the type of ions and their concentration in medium 20, but region 90 is typically much thinner than the evanescent wave region. Region 90 consequently lies within the evanescent wave region, so the light absorbing ions in region 90 absorb light rays (e.g. ray 114) which are incident upon reflective annular region 80 by frustrating or modulating TIR as aforesaid, and also absorb light rays (e.g. rays 116) which do not undergo TIR and which would otherwise pass through beads 14. The light absorbing, electrostatically charged ions need not completely cover the inward surfaces of hemi-beads 60, since as previously explained in relation to FIG. 2, many incident light rays interact several times with each hemi-bead 60 so substantial coverage results in an acceptable level of light absorption. In the FIG. 5A non-reflective state, region 92 is a "depletion region" containing a comparatively small number of light absorbing, electrostatically charged ions. The depletion region has no significant optical function in the non-reflective state, other than serving as a source of light absorbing, electrostatically charged ions.

In the reflective state—shown in FIG. 5B—voltage source 50 is actuated to apply a second voltage, having opposite polarity to the first voltage, between electrodes 46, 48. Consequently, the light absorbing, electrostatically charged ions are electrophoretically moved out of region 90, which, in the reflective state, becomes a depletion region containing a comparatively small number of light absorbing ions. Simultaneously, a large number of light absorbing ions suspended in medium 20 are electrophoretically moved into and concentrated within region 92 adjacent electrode 48, which, in the reflective state, becomes a concentration region containing a sufficiently large number of light absorbing ions to substantially cover the outward surface of electrode 48. Light absorbing ions which move out of region 90 do not move into region 92, but remain within medium 20, between regions 90, 92.

In the FIG. 5B reflective state, the comparatively small number of light absorbing ions in region 90 enables light rays (e.g. ray 114) which are incident upon one of hemi-bead 60s' reflective annular regions 80 to undergo TIR as aforesaid. Light rays (e.g. rays 116) which pass through hemi-beads 60 are absorbed by the comparatively large number of light absorbing ions in region 92.

TIR frustration can be increased in the FIG. 5A non-reflective state by increasing the absorption cross-section of the molecules which are dissolved in medium 20. More particularly, the dissolved molecules dissociate into electrostatically charged light absorbing ions having an absorption cross-section $A_c$, in accordance with the equation:

$$I = I_0 e^{-nA_c x}$$

where $I_0$ is the initial intensity of light passing through medium 20 along a path of length x, n is the number density (in units of $m^{-3}$) of light absorbing ions in the medium, $A_c$ is expressed in units of $m^{-2}$, and I is the resultant light intensity. It is thus apparent that any increase in $A_c$ (i.e. by selecting molecules having a larger $A_c$ characteristic) decreases the resultant light intensity I, for a given path length x and given ion number density n. A molecule's absorption cross-section is related to, but not strictly dependent on the molecule's size. Thus, a larger dye molecule would normally, but not always, have a larger absorption cross-section than a smaller dye molecule. As one example, polymer dye molecules having many monomer units and a single electron charge may be dissolved in medium 20. Each such molecule may be up to 10 nm long, it being noted that 10 nm is substantially smaller than the thickness (~0.5 μm) of the evanescent wave region. Since the molecules are relatively small, they are quickly and readily diffused into the evanescent wave region to frustrate TIR—a useful feature for any TIR-modulated device such as a reflective image display.

It is advantageous to prevent electrolysis or other electrochemical reactions from occurring at the surface of electrodes 46, 48 since such reactions may change the electrostatic charge characteristics of the light absorbing ions and may also cause irreversible chemical changes to electrodes 46, 48. This can be accomplished by coating electrodes 46, 48 with a thin (i.e. <10 μm) layer of insulating material such as a vapour-deposited oxide coating, or by adapting voltage source 50 to apply a sufficiently low voltage (i.e. <1V) such that electrochemical reaction does not occur.

TIR frustration can also be increased in the non-reflective state by increasing the effective surface area of electrodes 46, 48; thereby increasing their capacitance and consequently increasing the amount of charge transferred between the electrodes in response to an applied electric field. This can be achieved as shown in FIG. 6 by coating electrodes 46, 48 with thin (i.e. <250 nm) layers 94, 96 of transparent, electrically-conductive nano-structured or nano-porous material such as a carbon nanotube film as described in "Transparent Conductive Carbon Nanotube Films," Z. Wu et al., Science Vol. 305, No. 5668, pp. 1273-1276, or with a porous transparent conductive coating fabricated by the glancing angle deposition (GLAD) technique described by Robbie et al in U.S. Pat. Nos. 5,866,204; 6,206,065; and 6,248,422 which are incorporated herein by reference.

Nano-structured or nano-porous layers 94, 96 can yield an effective surface area several hundred times larger than that of an equally-sized non-nano-structured or non-nano-porous layer. The surface features of nano-structured or nano-porous layers 94, 96 are characterized by dimensions on the order of about 1 to 100 nm, which is much smaller than the wavelength of light (~500 nm). Consequently, nano-structured or nano-porous layers 94, 96 do not interfere with TIR of light rays. Although nano-structured or nano-porous layers 94, 96 are transversely electrically conductive (i.e. in the direction substantially perpendicular to flat outward viewing surface 17) they need not have high lateral electrical conductivity (i.e. in the direction substantially parallel to flat outward viewing surface 17) since electrodes 46, 48 have high lateral electrical conductivity. However, if nano-structured or nano-porous layers 94, 96 have sufficient lateral electrical conductivity, electrodes 46, 48 are not required.

An estimate of the reflectance of an array of hemispheres corresponding to the inward "hemi-bead" portions of each one of spherical beads 14 depicted in FIG. 1A can be obtained by multiplying the reflectance of an individual hemi-bead by the hemi-beads' packing efficiency coefficients. Calculation of the packing efficiency coefficient f of a closely packed structure involves application of straightforward geometry techniques which are well known to persons skilled in the art. The hexagonal closest packed (HCP) structure depicted in FIG. 7 yields a packing efficiency f∝π/(6·tan 30°)~90.7% assuming beads 14 are of uniform size.

Although the HCP structure yields the highest packing density for hemispheres, it is not necessary to pack the hemi-beads in a regular arrangement, nor is it necessary that the hemi-beads be of uniform size. A random distribution of non-uniform size hemi-beads having diameters within a range of about 1-50 μm has a packing density of approximately 80%, and has an optical appearance substantially similar to that of an HCP arrangement of uniform size hemi-beads. For some reflective display applications, such a randomly distributed arrangement may be more practical to manufacture, and for this reason, somewhat reduced reflectance due to less dense packing may be acceptable. However, for simplicity, the following description focuses on the FIG. 7 HCP arrangement of uniform size hemi-beads, and assumes the use of materials which yield a refractive index ratio $\eta_1/\eta_3$=1.5. These factors are not to be considered as limiting the scope of this disclosure.

The above-described "semi-retro-reflective" characteristic is important in a reflective display because, under typical viewing conditions where light source S is located above and behind viewer V, a substantial fraction of the reflected light is returned toward viewer V. This results in an apparent reflectance which exceeds the value $$R = 1 - \left(\frac{\eta_3}{\eta_1}\right)^2$$

by a "semi-retro-reflective enhancement factor" of about 1.5 (see "A High Reflectance, Wide Viewing Angle Reflective Display Using Total Internal Reflection in Micro-Hemispheres," Mossman, M. A. et al., Society for Information Display, 23rd International Display Research Conference, pages 233-236, Sep. 15-18, 2003, Phoenix, Ariz.). For example, in a system where the refractive index ratio $\eta_1/\eta_3$=1.5, the average surface reflectance, R, of 55% determined in accordance with Equation (1) is enhanced to approximately 85% under the semi-retro-reflective viewing conditions described above.

Individual hemi-beads 60 can be invisibly small, within the range of 2-50 μm in diameter, and as shown in FIG. 7 they can be packed into an array to create a display surface that appears highly reflective due to the large plurality of tiny, adjacent, reflective annular regions 80. In these regions 80, where TIR can occur, neither particles 26 (FIG. 1A) nor light absorbing ions (FIGS. 5A, 5B) impede the reflection of incident light when they are not in contact with the inward, hemispherical portions of beads 14. However, in regions 82 and 84, where TIR does not occur, particles 26 (or light absorbing ions) may absorb incident light rays-even if the particles (or ions) are moved outside the evanescent wave region so that they are not in optical contact with the inward, hemispherical portions of beads 14. The refractive index ratio $\eta_1/\eta_3$ can be increased in order to increase the size of each reflective annular region 80 and thus reduce such absorption losses. Non-reflective regions 82, 84 cumulatively reduce display 10's overall surface reflectance, R. Since display 10 is a reflective display, it is clearly desirable to minimize such reduction.

This can be achieved by forming backplane electrode 48 on sheet 24 using either one of patterns 100 or 102 depicted in FIG. 8A or 8B respectively. Black regions 104, 106 are electrically conductive regions, and may be either reflective or non-reflective. White regions 108, 110, 112 are reflective regions, and may be either electrically conductive or non-conductive—provided there is no electrical conductivity between regions 108, 110, 112 on the one hand and regions 104, 106 on the other hand.

Reflective regions 108, 110 are each preferably circular in shape, and have a diameter greater than or equal to (preferably equal to) the diameter of one of the non-reflective, circular regions 82 of one of hemi-beads 60. Pattern 100's regions 104 have an overall size and shape substantially similar to the overall size and shape of regions 80, 84 of hemi-beads 60.

The optical properties of regions 104, 106 are relatively unimportant, as are those of sheet 24. It may however be advantageous to provide a reflective outward surface on sheet 24 and to form regions 104 (or 106) thereon, with the remaining portions of sheet 24's reflective outward surface constituting regions 108 (or 110, 112).

When used as explained below, patterned backplane electrode 100 decreases absorptive losses due to light absorption in regions 82, but does not decrease absorptive losses due to light absorption in gap regions 84. By contrast, when used as explained below, patterned backplane electrode 102 decreases absorptive losses due to light absorption in both regions 82 and 84. This is achieved by forming pattern 102 with each one of reflective regions 112 having a size and shape which is substantially similar to the size and shape of one of gaps 84, with each region 112 in the same location relative to its adjacent reflective regions 110 as the location of a corresponding one of gaps 84 relative to that gap's adjacent regions 82.

Figure 9B:
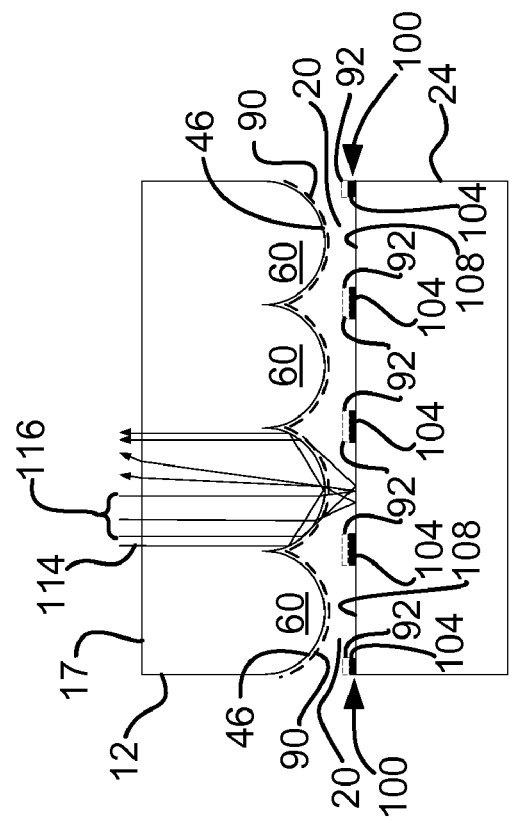
FIGS. 9A and 9B are greatly enlarged, not to scale, fragmented cross-sectional side elevation views of a portion of an electrophoretically frustrated (i.e. modulated) reflective image display the FIG. 8A backplane electrode pattern and incorporating light absorbing, electrostatically charged ions.
Figure 9A:
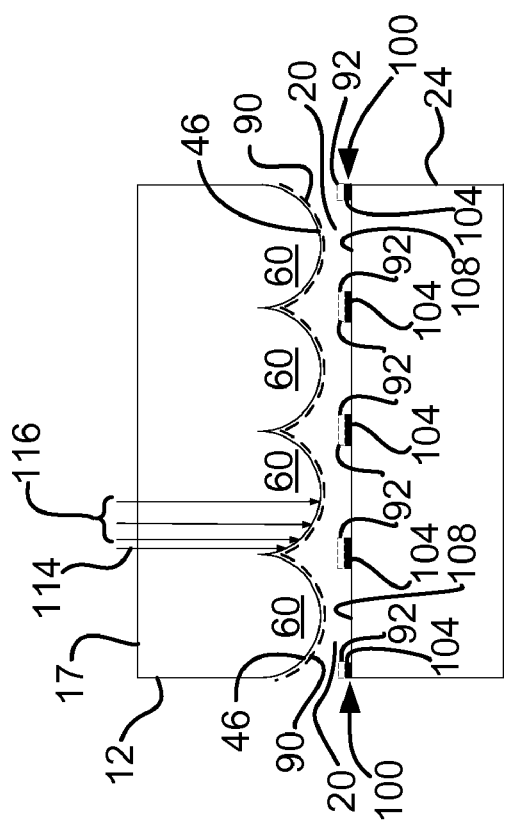

Patterned backplane electrode 100 (or 102) is positioned with respect to monolayer 18 to align each circular reflective region 108 (or 110) with a corresponding one of non-reflective, circular regions 82; thereby also aligning electrically conductive region 104 (or 106) with reflective regions 80. FIGS. 9A and 9B depict a reflective image display incorporating patterned backplane electrode 100 aligned as aforesaid, and incorporating light absorbing, electrostatically charged ions. Operation in the non-reflective state, depicted in FIG. 9A, is substantially similar to the non-reflective state operation previously described in relation to FIG. 5A, and need not be described further.

In the reflective state—shown in FIG. 9B—when voltage source 50 is actuated to apply an appropriate voltage between electrodes 46, 104 the light absorbing ions are electrophoretically moved out of region 90, which, in the reflective state, becomes a depletion region containing a comparatively small number of light absorbing ions. Simultaneously, large numbers of light absorbing ions suspended in medium 20 are electrophoretically moved into and concentrated within regions 92 adjacent each electrically conductive region 104 of patterned backplane electrode 100 (or to the electrically conductive regions 106 of a patterned backplane electrode 102 if it is substituted for patterned backplane electrode 100). Since regions 104 are aligned with the reflective annular regions 80 of hemi-beads 60, the light absorbing ions are concentrated away from reflective regions 108 of patterned backplane electrode 100. Relatively few light absorbing ions remain in medium 20 outside regions 92, significantly reducing light absorption in medium 20 between the non-reflective circular regions 82 of hemi-beads 60 and the reflective regions 108 of patterned backplane electrode 100.

Light rays (e.g. ray 114 in FIG. 9B) which are incident upon one of hemi-bead 60s' reflective annular regions 80 undergo TIR as aforesaid. Since relatively few light absorbing ions remain in medium 20 outside regions 92, most light rays (e.g. rays 116 in FIG. 9B) which do not undergo TIR are able to pass through medium 20 to one of reflective regions 108 and those rays are therefore also reflected.

Advantageously, the concentration of light absorbing ions in electrophoretic medium 20 is sufficiently high to achieve good light absorption in the FIG. 9A non-reflective state, and sufficiently low that most light absorbing ions in medium 20 are concentrated toward electrode 48 in the FIG. 9B reflective state to reduce the amount of light absorbed by ions remaining in medium 20 outside regions 92 in the reflective state.

If hemi-bead monolayer 18 is positioned an appropriate distance above reflective regions 108, the transmitted light rays are focused toward reflective annular regions 80, such that the light rays are returned approximately in the direction from which they came. This further enhances the display's semi-retro-reflective characteristic, and can result in a perceived reflectance value exceeding 100%. Even with the absorptive losses associated with a red-green-blue (RGB) colour filter array, patterned backplane electrodes 100, 102 facilitate production of reflective image displays having a brightness comparable to that of coloured ink on white paper.

Persons skilled in the art will understand that nano-structured or nano-porous layers 94, 96 previously described in relation to FIG. 6 can be applied to the embodiment of FIGS. 9A, 9B. Persons skilled in the art will also understand that a wide range of lens concentration structures, semi-retro-reflective reflectors and/or semi-specular reflectors can be applied to any of the embodiments of FIGS. 5A, 5B; 6; or 9A, 9B.

Substitution of light absorbing, electrostatically charged ions for absorptive particles 26 provides advantages besides the aforementioned reduction of susceptibility to shortcomings caused by particle agglomeration. For example, a display incorporating light absorbing, electrostatically charged ions can be switched more quickly between the reflective and non-reflective states than a prior art display incorporating absorptive particles 26, since the ions are much smaller than and thus have greater electrophoretic mobility than particles having approximately the same electrostatic charge. A display incorporating light absorbing, electrostatically charged ions also has lower voltage requirements than a prior art display incorporating absorptive particles 26. For example, a display incorporating light absorbing, electrostatically charged ions can be operated below 1 volt, which is also advantageous to prevent electrolysis or other electrochemical reactions from occurring at the surface of electrodes 46, 48. A display incorporating light absorbing, electrostatically charged ions is also less likely to develop a hysteresis response characteristic—hysteretic response being a shortcoming of prior art displays incorporating absorptive particles. Furthermore, a display incorporating light absorbing, electrostatically charged ions has greater chemical purity than a prior art display incorporating absorptive particles, since commercially available pigment particles 26 or other suitable particles 26 tend to have variable have chemical purity due to impurities which can cause unpredictable and undesirable display behaviour.

While a number of exemplary aspects and embodiments have been discussed above, those of skill in the art will recognize certain modifications, permutations, additions and sub-combinations thereof. For example, TIR frustration by electrophoretic movement of light absorbing, electrostatically charged ions can be applied not only to hemi-beaded surfaces but also to any microstructured or nanostructured surface having the characteristic that a substantial portion of the light rays normally incident on the microstructures or nanostructures undergoes TIR. All such modifications, permutations, additions and sub-combinations are within the true spirit and scope of this disclosure. It is therefore intended that the following appended claims and claims hereafter introduced are interpreted to include all such modifications, permutations, additions and sub-combinations as are within their true spirit and scope.

What is claimed is:

1. A reflective display, comprising:
   a plurality of transparent hemi-beads protruding inwardly from an inward surface of a transparent sheet having an outward viewing surface, each hemi-bead having a reflective region surrounding a non-reflective region;
   a second sheet spaced inwardly from the transparent sheet to define a reservoir between the transparent sheet and the second sheet;
   an electrophoresis medium within the reservoir;
   the display characterized by:
   a plurality of light absorbing, electrostatically charged ions dissolved in the medium; and
   a voltage source for applying a voltage across the medium, between the hemi-beads and the second sheet.

2. A reflective display as defined in claim 1, further comprising:
- a first electrode formed on an inward side of the transparent sheet;
- a second electrode formed on an outward side of the second sheet;
- a transparent, electrically-conductive, nano-structure on the first electrode; and
- a transparent, electrically-conductive, nano-structure on the second electrode.

3. A reflective display as defined in claim 1, wherein the ions further comprise at least one electrostatically positively charged ion and at least one electrostatically negatively charged ion, and wherein the ions are soluble in the medium.

4. A reflective display as defined in claim 2, wherein the ions further comprise at least one electrostatically positively charged ion and at least one electrostatically negatively charged ion, and wherein the ions are soluble in the medium.

5. A reflective display as defined in claim 1, wherein the ions have a large absorption cross-section and further comprise at least one electrostatically positively charged ion and at least one electrostatically negatively charged ion.

6. A reflective display as defined in claim 1, wherein:
- the ions further comprise at least one electrostatically positively charged ion and at least one electrostatically negatively charged ion;
- actuation of the voltage source to apply a first voltage across the medium moves sufficiently many of the ions into an evanescent wave region adjacent inward surfaces of the hemi-beads to frustrate total internal reflection of light rays at the reflective regions of the hemi-beads and to absorb light rays at the non-reflective regions of the hemi-beads; and
- actuation of the voltage source to apply a second voltage across the medium moves sufficiently many of the ions away from the evanescent wave region to permit total internal reflection of light rays at the reflective regions of the hemi-beads.

7. A reflective display as defined in claim 1, further comprising means for selectably reflecting light rays from the second sheet through the non-reflective regions of the hemi-beads.

8. A reflective display as defined in claim 1, the means for selectably reflecting light rays further comprising an electrode formed on an outward side of the second sheet in a pattern comprising:
- (a) an electrically conductive region; and
- (b) a first plurality of reflective regions;
- each one of the first plurality of reflective regions on the second sheet corresponding to and aligned with a corresponding one of the non-reflective regions of the hemi-beads.

9. A reflective display as defined in claim 8, further comprising:
- a first electrode formed on an inward side of the transparent sheet;
- a second electrode formed on an outward side of the second sheet;
- a transparent, electrically-conductive, nano-structure on the first electrode; and
- a transparent, electrically-conductive, nano-structure on the second electrode.

10. A reflective display as defined in claim 9, wherein each one of the first plurality of reflective regions of the second sheet has a size and shape substantially similar to a size and shape of the corresponding one of the non-reflective regions of the hemi-beads.

11. A reflective display as defined in claim 10, further comprising a thin, transparent, electrically-conductive, nano-structured coating on the electrode.

12. A reflective display as defined in claim 11, further comprising:
- a first electrode formed on an inward side of the transparent sheet;
- a second electrode formed on an outward side of the second sheet;
- a transparent, electrically-conductive, nano-structure on the first electrode; and
- a transparent, electrically-conductive, nano-structure on the second electrode.

13. A reflective display as defined in claim 11, wherein:
- each one of the hemi-beads is adjacent to another one or more of the hemi-beads, the display further comprising a non-reflective gap between each adjacent one or more of the hemi-beads;
- the pattern further comprising a second plurality of reflective regions on the outward side of the second sheet; and
- each one of the second plurality of reflective regions corresponds to and is aligned with a corresponding one of the gaps.

14. A reflective display as defined in claim 13, further comprising:
- a first electrode formed on an inward side of the transparent sheet;
- a second electrode formed on an outward side of the second sheet;
- a transparent, electrically-conductive, nano-structure on the first electrode; and
- a transparent, electrically-conductive, nano-structure on the second electrode wherein each one of the reflective regions of the hemi-beads has an annular shape.

15. A method of increasing the reflectance of a reflective display having a plurality of transparent hemi-beads protruding inwardly from an inward surface of a transparent sheet having an outward viewing surface, each hemi-bead having a reflective region surrounding a non-reflective region, a second sheet spaced inwardly from the transparent sheet to define a reservoir between the transparent sheet and the second sheet, an electrophoresis medium within the reservoir, the method characterized by:
- dissolving a plurality of light absorbing, electrostatically charged ions in the medium;
- applying a first voltage across the medium to move a substantial number of the ions into an evanescent wave region adjacent inward surfaces of the hemi-beads to frustrate total internal reflection of light rays at the reflective regions of the hemi-beads and to absorb light rays at the non-reflective regions of the hemi-beads; and
- applying a second voltage across the medium to move a substantial number of the ions away from the evanescent wave region to permit total internal reflection of light rays at the reflective regions of the hemi-beads.

16. A method as defined in claim 15, further comprising:
- providing a first electrode on an inward side of the transparent sheet;
- providing a second electrode on an outward side of the second sheet;
- providing a transparent, electrically-conductive, nano-structure on the first electrode; and
- providing a transparent, electrically-conductive, nano-structure on the second electrode.

17. A method as defined in claim 16, further comprising:
providing the second electrode in a pattern comprising:
  (I.) an non-reflective region;
  (ii.) a first plurality of reflective regions; and
  aligning each one of the first plurality of reflective regions with a corresponding one of the non-reflective regions of the hemi-beads; and
  wherein applying the second voltage across the medium further moves a substantial number of the ions into a position in which the ions substantially cover the non-reflective region of the electrode without covering the first plurality of reflective regions.

18. A method as defined in claim 17, further comprising spacing the transparent sheet at a distance from the second sheet, the distance selected such that an incident light ray reflected by one of the first plurality of reflective regions of the electrode is reflected in a direction substantially opposite to an incidence direction of the incident light ray.

19. A method as defined in claim 18, further comprising forming each one of the first plurality of reflective regions in a size and shape substantially similar to a size and shape of one of the non-reflective regions of the hemi-beads.

20. A method as defined in claim 18, further comprising forming the non-reflective region in an overall size and shape substantially similar to an overall size and shape of the reflective regions of the hemi-beads.

21. A method as defined in claim 20, wherein:
  each one of the hemi-beads is adjacent to another one or more of the hemi-beads;
  a non-reflective gap exists between each adjacent one or more of the hemi-beads;
  the pattern further comprising a second plurality of reflective regions, each one of the second plurality of reflective regions having a size and shape substantially similar to a size and shape of one of the gaps.

22. A method as defined in claim 21, wherein each one of the non-reflective regions of the hemi-beads has a circular shape having a first diameter, the method further comprising forming each one of the first plurality of reflective regions in a circular shape having a second diameter substantially equal to the first diameter.

23. A reflective display as defined in claim 11, further comprising a thin, transparent, electrically-conductive, nano-structured coating on the electrode and wherein:
  each one of the non-reflective regions of the hemi-beads has a circular shape having a first diameter; and
  each one of the first plurality of reflective regions of the pattern has a circular shape having a second diameter substantially equal to the first diameter.

24. A reflective display as defined in claim 12, wherein:
  each one of the non-reflective regions of the hemi-beads has a circular shape having a first diameter; and
  each one of the first plurality of reflective regions of the pattern has a circular shape having a second diameter substantially equal to the first diameter.

25. A reflective display as defined in claim 24, wherein each one of the reflective regions of the hemi-beads has an annular shape.

* * * * *